United States Patent
Knecht et al.

(10) Patent No.: US 11,736,740 B2
(45) Date of Patent: *Aug. 22, 2023

(54) DELIVERING VIDEO IN A CONTENT DELIVERY NETWORK

(71) Applicant: Cloudflare, Inc., San Francisco, CA (US)

(72) Inventors: Dane Orion Knecht, Austin, TX (US); Igor Postelnik, Austin, TX (US); Oliver Yu, Austin, TX (US); John Graham-Cumming, London (GB); Dani Grant, San Francisco, CA (US); Nitin Rao, San Francisco, CA (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/020,580

(22) Filed: Sep. 14, 2020

(65) Prior Publication Data

US 2020/0413112 A1 Dec. 31, 2020

Related U.S. Application Data

(63) Continuation of application No. 15/726,315, filed on Oct. 5, 2017, now Pat. No. 10,779,015.
(Continued)

(51) Int. Cl.
*H04N 21/231* (2011.01)
*H04N 21/232* (2011.01)
(Continued)

(52) U.S. Cl.
CPC ... *H04N 21/23103* (2013.01); *H04N 21/2181* (2013.01); *H04N 21/2323* (2013.01);
(Continued)

(58) Field of Classification Search
CPC ......... H04N 21/23103; H04N 21/2181; H04N 21/2323; H04N 21/2393; H04N 21/26258
See application file for complete search history.

(56) References Cited

U.S. PATENT DOCUMENTS 6,415,323 B1 7/2002 McCanne et al.
7,930,421 B1 4/2011 Bertz et al.
(Continued)

OTHER PUBLICATIONS

"Swarmify FAQ", <http://web.archive.org/web/20160809162139/https/swarmify.com/faq/>, retrieved Oct. 5, 2017, 3 pages.
(Continued)

*Primary Examiner* — Andrew C Georgandellis
(74) *Attorney, Agent, or Firm* — Nicholson De Vos Webster & Elliott LLP

(57) ABSTRACT

A server in a content delivery network (CDN) receives a request for a web page of a domain handled by an origin server. The server retrieves the web page and the web page references a video. The server retrieves a file that indicates a list of locations of the domain in which segments of the video are located. The server fetches at least an initial portion of the segments. The server receives a request for the video. The server transmits to the requester at least the initial portion of the segments. The server receives a subsequent request of a different portion of the segments. The server transmits a response to the requester that instructs the requester to transmit the request for the different portion of segments to a second server in the CDN.

24 Claims, 6 Drawing Sheets

Related U.S. Application Data

(60) Provisional application No. 62/564,254, filed on Sep. 27, 2017.

(51) Int. Cl.
   *H04N 21/845* (2011.01)
   *H04N 21/239* (2011.01)
   *H04N 21/218* (2011.01)
   *H04N 21/262* (2011.01)

(52) U.S. Cl.
   CPC ... *H04N 21/2393* (2013.01); *H04N 21/26258* (2013.01); *H04N 21/8456* (2013.01)

(56) References Cited

U.S. PATENT DOCUMENTS

| | | | |
|---|---|---|---|
| 8,169,916 | B1 | 5/2012 | Pai et al. |
| 8,738,766 | B1* | 5/2014 | Kazerani ............... H04L 45/70 |
| | | | 709/224 |
| 9,081,856 | B1* | 7/2015 | Scott .................. G06F 3/04842 |
| 9,118,680 | B1* | 8/2015 | Dunlap .................. H04L 65/80 |
| 9,800,639 | B2 | 10/2017 | Gordon |
| 9,819,721 | B2 | 11/2017 | Bendell |
| 9,959,019 | B1* | 5/2018 | Qureshi ............. H04N 21/8193 |
| 2002/0197593 | A1* | 12/2002 | Sutton .................... G09B 5/00 |
| | | | 434/308 |
| 2008/0034393 | A1 | 2/2008 | Crayford |
| 2008/0086750 | A1* | 4/2008 | Yasrebi ................. H04N 21/84 |
| | | | 725/86 |
| 2009/0113057 | A1 | 4/2009 | Van et al. |
| 2009/0125812 | A1* | 5/2009 | Blinnikka .......... G06F 16/4393 |
| | | | 715/716 |
| 2010/0058405 | A1 | 3/2010 | Ramakrishnan et al. |
| 2011/0035441 | A1 | 2/2011 | Osuga |
| 2011/0078717 | A1 | 3/2011 | Drummond et al. |
| 2012/0137336 | A1 | 5/2012 | Applegate et al. |
| 2013/0132605 | A1 | 5/2013 | Kocks et al. |
| 2013/0145001 | A1* | 6/2013 | Qian ..................... H04L 67/289 |
| | | | 709/223 |
| 2014/0003799 | A1 | 1/2014 | Soroushian et al. |
| 2014/0007146 | A1 | 1/2014 | Peterson et al. |
| 2014/0207912 | A1 | 7/2014 | Thibeault et al. |
| 2014/0250468 | A1 | 9/2014 | Barr et al. |
| 2014/0280679 | A1 | 9/2014 | Dey et al. |
| 2014/0379871 | A1* | 12/2014 | Van Brandenburg ....................... |
| | | | H04L 65/1069 |
| | | | 709/219 |
| 2015/0120821 | A1* | 4/2015 | Bendell ................. G06F 16/957 |
| | | | 709/203 |
| 2015/0207846 | A1* | 7/2015 | Famaey ............... H04L 65/4084 |
| | | | 709/219 |
| 2015/0256577 | A1* | 9/2015 | Gutierrez Vilaro ......................... |
| | | | H04L 65/4084 |
| | | | 709/203 |
| 2016/0211004 | A1* | 7/2016 | Akatiff ................. G11B 27/031 |
| 2017/0078350 | A1 | 3/2017 | Gordon |
| 2017/0244680 | A1 | 8/2017 | Chen |

OTHER PUBLICATIONS

Final Office Action, U.S. Appl. No. 15/726,315, dated Jan. 10, 2020, 21 pages.

Notice of Allowance, U.S. Appl. No. 15/726,315, dated May 8, 2020, 6 pages.

* cited by examiner

DELIVERING VIDEO IN A CONTENT DELIVERY NETWORK

CROSS-REFERENCE TO RELATED APPLICATIONS

This application is a continuation of Ser. No. 15/726,315, filed Oct. 5, 2017, which claims the benefit of U.S. Provisional Application No. 62/564,254, filed Sep. 27, 2017, which is hereby incorporated by reference.

FIELD

Embodiments of the invention relate to the field of video delivery; and more specifically, to delivering video in a content delivery network.

BACKGROUND

Video traffic over the internet has increased and is expected to continue to increase. Typically, video distribution has been performed by a single server delivering a single stream to the requesting client device (either through downloading, progressive downloading, or streaming). Adaptive bitrate streaming techniques may be used where a single video is encoded into multiple bit rates and typically segmented. The client detects the bandwidth and capacity in real time and adjusts which bit stream to download accordingly. Thus, if the client is experiencing high network traffic, a lower bit stream can be downloaded and played and if network conditions improve, a higher bit stream can be downloaded and played.

Existing content delivery networks (CDNs) may be configured to distribute videos. These CDNs include multiple servers that are geographically distributed that may store video content. When a requester submits a request for video, the server that is nearest to the requester delivers the video. Typically, the same server of the CDN delivers the entire video to a requester.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
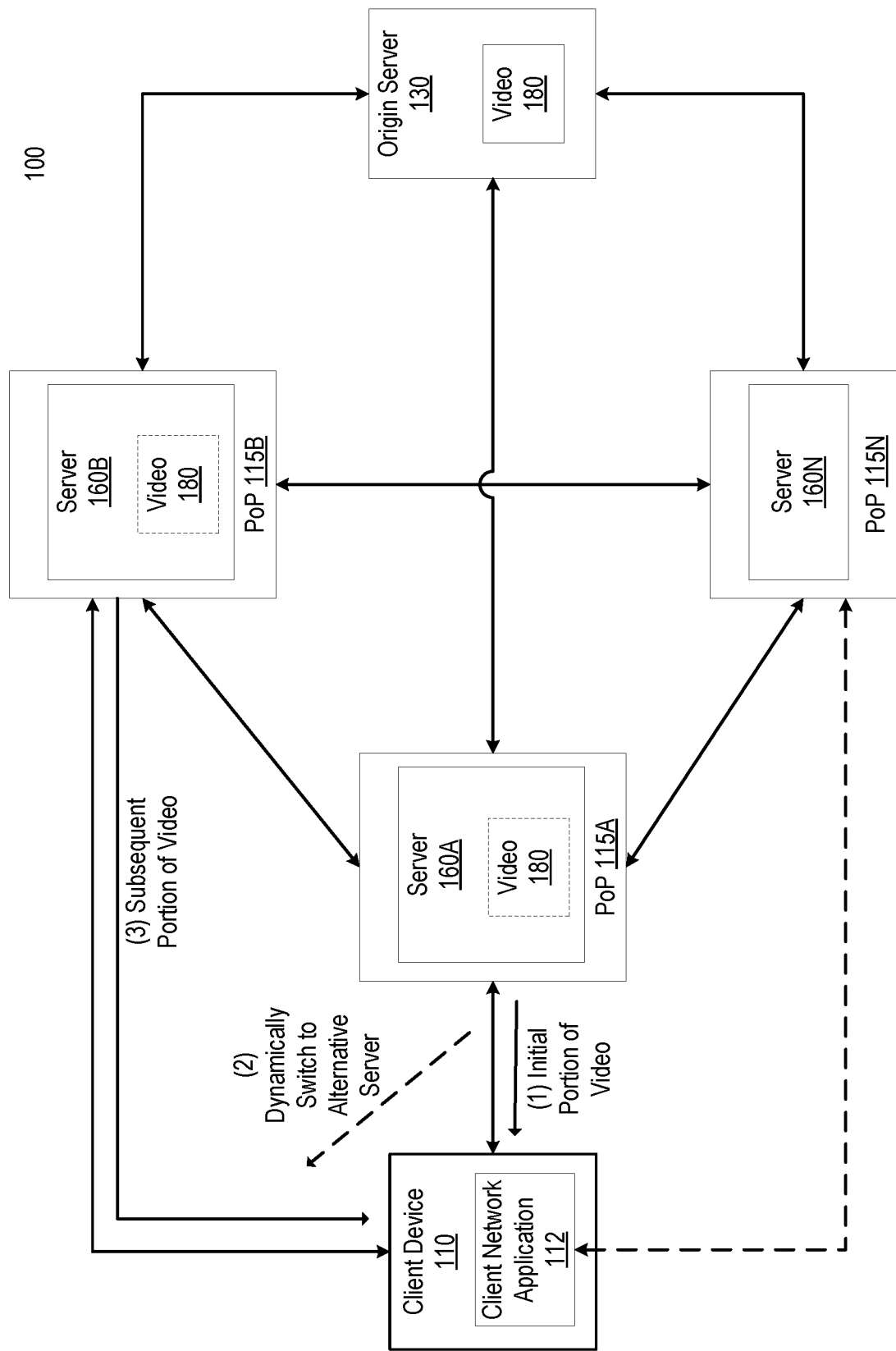
FIG. 1 is a block diagram that illustrates a system for delivering video in a CDN, according to an embodiment.

A method and apparatus for delivering video in a content delivery network (CDN) is described. The CDN includes multiple points-of-presences (PoPs) that are typically geographically distributed (e.g., in different locations throughout the world). Each PoP may include one or more servers (e.g., one or more edge servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site.

In an embodiment, an initial portion of a requested video (e.g., the first X number of seconds or frames, or a lower quality of frames) is served from the PoP that is closest to the requester, and a subsequent portion of the requested video is served from a different PoP. The PoP that is the closest to the request may be determined based on routing protocol configuration according to an anycast implementation, or may be based on DNS redirection. After the initial portion of the requested video is delivered to the requester, a subsequent portion of the video may be served from a different PoP of the CDN if the video can be received by the client without degrading user experience (e.g., without video playback pausing or buffering). The video player may calculate how much video it must buffer, based on the download speed and bit rate of the video, to ensure that video playback is not subject to buffering or otherwise be subject to degraded user experience. The different PoP may be selected based on the connection cost, performance, traffic information, and/or capacity. If, after the player is receiving video from the different PoP, the video player requests a portion of the video not in the buffer (e.g., the user has fast-forwarded or seeked forward to a position of the video not in the buffer), the PoP that is closest to the requester may switch back to serving an initial portion of the video starting at the requested position.

In an embodiment, the initial portion of the requested video may be delivered at a lower quality bit rate and subsequent portions of the video may be delivered at a higher quality bit rate, depending on the conditions of the network.

In an embodiment, at least a portion of a video may be prepositioned in one or more of the PoPs of the CDN. For instance, a video (or a portion of the video) that is likely to be requested by clients (e.g., a popular video) may be prepositioned in one or more PoPs. The PoP(s) that are prepopulated with a particular video may depend on the likelihood of that video being requested in that geographic region served by that PoP. For instance, a video that is in the Russian language may be popular and thus prepositioned in PoP(s) serving visitors in Russia, but may not be popular and thus not prepositioned in PoP(s) serving visitors in the United States.

A single video file may be encoded at different bit rates creating different versions of the single video file to allow delivery to clients under different network connections and conditions (e.g., a high-quality bit rate for fast connections, medium-quality bit rate for average connections, low-quality bit rate for slow connections). Each of these video file versions may be segmented into multiple segments. A video configuration file may indicate the location (e.g., the URL) where each segment is located (e.g., a manifest or playlist), which is typically used by the client when requesting the segment. The client may use this video configuration file to select the next segment to download and play based on current network conditions. The selected segment is typically the segment that has the highest bit rate that is expected to be able to be downloaded and played without degrading user experience (e.g., without causing a buffering stall). If a client requests this video configuration file, then it is reasonable to assume that the client will request at least some of the segments indicated in the file.

In an embodiment, upon a server in a PoP receiving a video configuration file, the server fetches at least an initial portion of the segments of video if not already stored locally at that PoP. The fetching may begin prior to the client requesting that segment to reduce the time necessary to serve the video to the client. The server may download all versions of at least the initial portion of the segments. Alternatively, the server may predict the segment versions that will be requested by the client (e.g., based on the user-agent of the client that may suggest the screen size and/or type of operating system, and/or analyzing historical data to determine if the client is on a fast or slow network) and download only the initial portion of the that segment version if not already stored in cache at that PoP. The server may download the segments from the origin server, and/or may download the segments from a different server in a different PoP, if stored at that PoP). In an embodiment, the server may push at least the initial segments to the client prior to the client requesting those segments. For example, HTTP/2 server push can be used to push at least the initial segments. The server may push all versions of the at least initial segment, or may push only the segment versions that are predicted to be requested by the client.

In certain circumstances, a single video file may not be segmented on the origin, and/or there may not be multiple versions of the video file on the origin. The client may request a web page (or other internet resource) that links to the video file. In such a case, a server in a PoP may begin to download at least an initial portion of the video file prior to the client requesting the video file upon receipt of the request of the web page or retrieval of the web page that includes a link to the video file, if the video file is not already stored locally at that PoP. The server may download at least the initial portion of the video file from the origin server, and/or from a different server in a different PoP, if stored at that PoP. In an embodiment, the server may push at least the initial portion of the video file to the client prior to the client requesting the video file, such as by using HTTP/2 server push.

If a video asset (whether it is a segment or a complete video file) is available at a different server in a different PoP, the server may cause the client to redirect to request the video asset at that different server. The redirect may be in the form of an HTTP 302 redirect message to a unicast IP address of the different server.

FIG. 1 is a block diagram that illustrates a system for delivering video in a CDN, according to an embodiment. The system 100 includes the client device 110 that runs the client network application 112, the PoPs 115A-N, and the origin server 130. The client device 110 is a computing device (e.g., laptop, workstation, smartphone, mobile phone, tablet, gaming system, set top box, wearable device, Internet of Things (IoT) device, etc.) that is capable of transmitting and/or receiving network traffic. The client network application 112 may be a web browser, native application, or other application that can access network resources (e.g., web pages, images, word processing documents, PDF files, movie files, music files, or other computer files).

The PoPs 115A-N include the servers 160A-N respectively. Each PoP 115 may be part of a different data center or colocation site. The PoPs 115A-N may be geographically distributed as part of the CDN, which may decrease the distance between requesting client devices and content. Although not illustrated in FIG. 1, each PoP 115 may also include one or more DNS servers (e.g., authoritative name servers, DNS proxy servers), one or more control servers, and one or more other pieces of network equipment such as router(s), switch(es), and/or hubs.

The servers 160A-N may be edge servers in the CDN. The servers 160A-N may operate as a reverse proxy and receive requests for network resources (e.g., HTTP requests) on the origin server 130. The servers 160A-N may have a same anycast IP address for a domain of the origin server 130. For example, if the origin server 130 handles the domain "example.com", a DNS request for "example.com" returns an address record having the anycast IP address of the servers 160A-N. Which one of the servers 160A-N receives a request from a client depends on which server 160 is closest to the client in terms of routing protocol configuration (e.g., Border Gateway Protocol (BGP) configuration) according to an anycast implementation as determined by the network infrastructure (e.g., router(s), switch(es), and/or other network equipment between the client and the servers 160A-N).

The origin server 130 is a computing device on which a network resource resides and/or originates (e.g., web pages, images, word processing documents, PDF files, movie files, music files, or other computer files). As illustrated in FIG. 1, the origin server 130 includes the video 180. The video 180 may be encoded at different bit rates creating different versions of the video 180 to allow delivery to clients under different network connections and conditions (e.g., a high-quality bit rate for fast connections, medium-quality bit rate for average connections, low-quality bit rate for slow connections). Each of these video file versions may be segmented into multiple segments.

The video 180 may be included on one or more of the servers 160A-N. In an embodiment, at least a portion of the video 180 may be downloaded by one or more of the servers 160A-N in response to a request for that video from a client device. In another embodiment, at least a portion of the video 180 may be prepositioned on one or more of the servers 160A-N.

Figure 2:
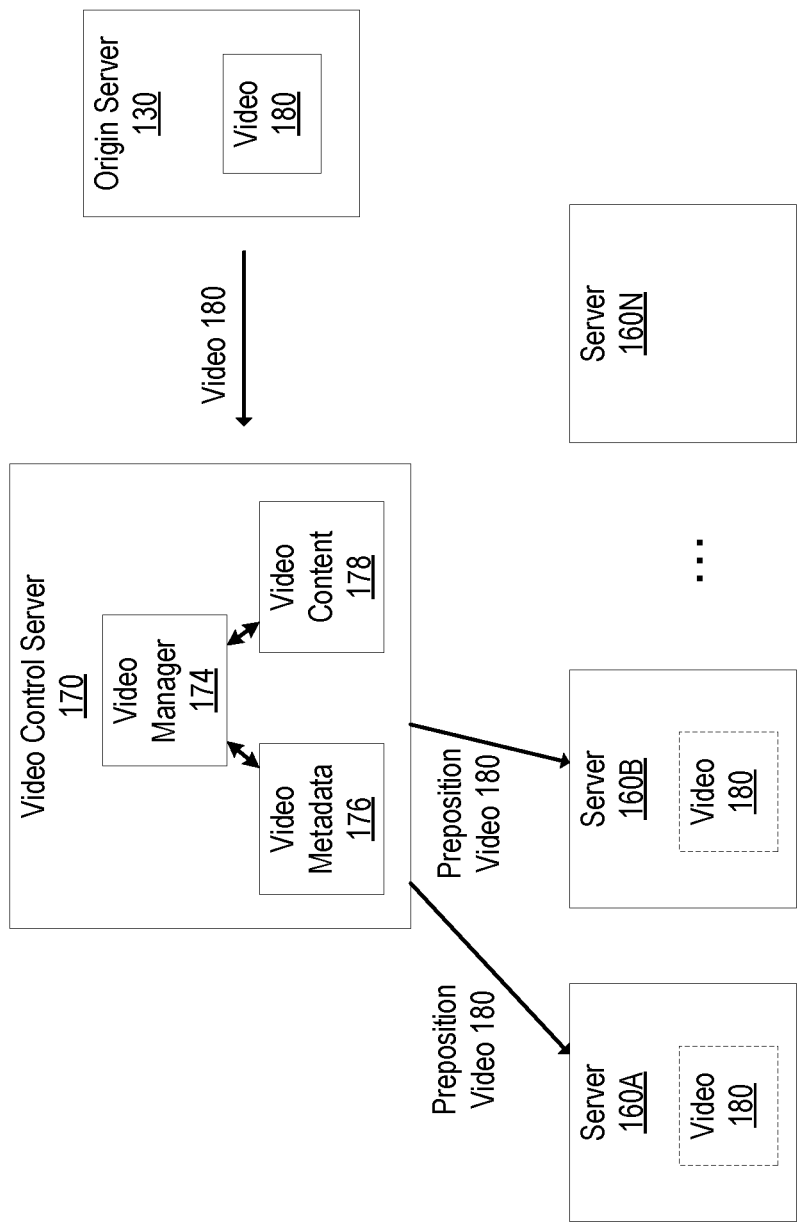
FIG. 2 is a block diagram that illustrates a system for video delivery being managed by a video control server, according to an embodiment.

In an embodiment, the video 180 is uploaded or downloaded to the CDN service. FIG. 2 is a block diagram that illustrates a system for video delivery being managed by the video control server 170. The video control server 170 may be part of the CDN service. The video control server 170 includes the video manager 174 that manages the videos that are distributed to the server(s) 160A-N. The video metadata 176 stores metadata for the video content (e.g., identifier, name, size, type, optional labels, etc.), and the current status of the video content (e.g., the upload status from the origin server to the video control server, the status of the video 180 at each of the servers 160A-N). The video content 178 stores the video files. The site owner may upload the video 180 to the video control server 170 or alternatively supply a URL to the video control server 170 that causes the video 180 to be downloaded by the video control server 170. In an embodiment, the video manager 174 may convert the video into forms for streaming (e.g., MPEG-DASH and/or HLS format). Additionally, or alternatively, the video manager 174 may encode the video 180 into multiple different bit rates. The video manager 174 may cause at least a portion of the video 180 to be prepositioned on one or more of the servers 160A-N, which will be described in greater detail later herein.

In an embodiment, an initial portion of a requested video (e.g., the first X number of seconds or frames, or a lower quality of frames) is served from the PoP that is closest to the requester, and a subsequent portion of the requested video is served from a different PoP. As shown in FIG. 1 at operation 1, since the server 160A is the server 160 that is closest to the client device 110, an initial portion of the video 180 is served from the server 160A to the client device 110. After the initial portion is delivered to the client device 110, at operation 2, the video is dynamically switched to be served from the server 160B instead of the server 160A, and a subsequent portion of the video is served from the server 160B at operation 3.

Figure 3:
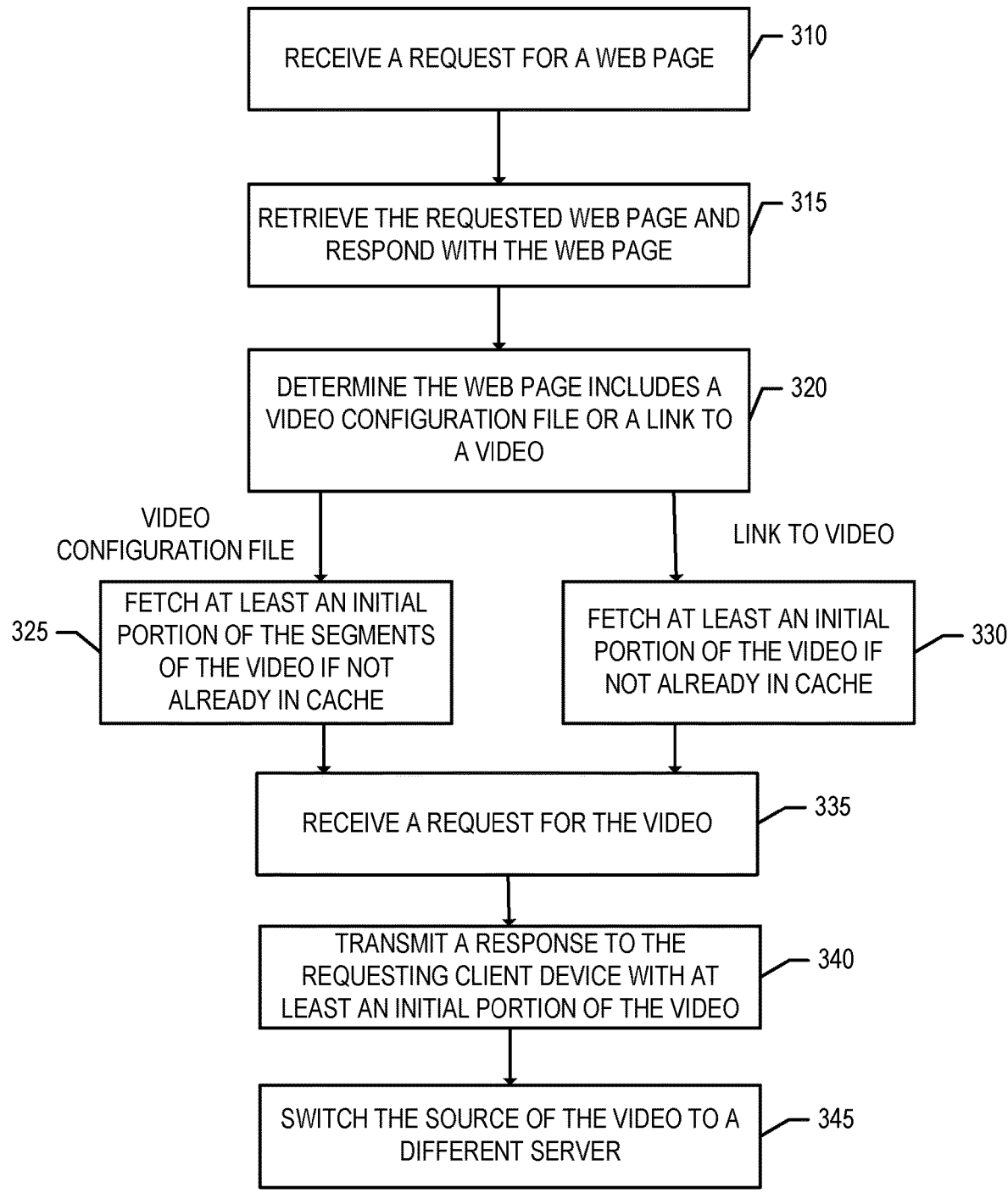
FIG. 3 is a flow diagram that illustrates exemplary operations for delivering video in a CDN, according to an embodiment

FIG. 3 is a flow diagram that illustrates exemplary operations for delivering video in a CDN, according to an embodiment. The operations of FIG. 3 will be described with respect to the exemplary embodiment of FIGS. 1-2. The operations of FIG. 3 will be described with respect to the exemplary embodiment of FIGS. 1-2. However, the operations of FIG. 3 can be performed by different embodiments than those of FIGS. 1-2, and FIGS. 1-2 can perform operations different than those of FIG. 3.

At operation 310, the server 160A of the PoP 115A receives a request for an action to be performed on an identified resource (e.g., an HTTP GET request) of the origin server 130. The request may be for a web page. The request may be received by the server 160A because of a Domain Name System (DNS) request for the domain of the requested resource returning an IP address of the server 160A instead of an IP address of the origin server 130. For example, if the origin server 130 handles the domain "example.com", a DNS request for "example.com" returns an IP address of the server 160A instead of an IP address of the origin server 130. In some embodiments, multiple domains that may be owned by different domain owners may resolve to the server 160A (e.g., resolve to the same IP address or a different IP address of the server 160A). In an embodiment, the server 160A is one of multiple edge servers that are geographically distributed and are anycasted to the same IP address or the same set of IP address. For instance, the servers 160A-N may be anycasted to the same IP address. The edge server 160A may receive the request because it is the closest server to the requesting client device 110 in terms of routing protocol configuration (e.g., Border Gateway Protocol (BGP) configuration) according to an Anycast implementation as determined by the network infrastructure (e.g., the routers, switches, or other network equipment between the requesting client device 110 and the edge server) that is not illustrated in FIG. 1 for simplicity purposes.

Next, at operation 315, the server 160A retrieves the requested web page and responds to the client device 110 with the web page. The server 160A can retrieve the requested web page from cache if available. If not available in cache, the server 160A may retrieve the requested web page from the origin server 130. For example, the server 160A may transmit a request for the web page and receive a response having the requested page from the origin server 130. The server 160A may cache the web page.

Next, at operation 320, the server 160A determines that the requested web page includes a video configuration file that contains information about video segments of the video 180 (e.g., the location of the video segments) (or a link to a video configuration file), or a link to a video 180. For example, the server 160A may scan through the web page to determine if there is a video configuration file and/or a link to a video. If there is a video configuration file, then flow moves to operation 325.

Prior to transmitting the response including the requested web page to the client device 110 as described in operation 315, the server 160A may modify the video configuration file to include a listing of alternative servers of the CDN that may be able to serve the video. In an embodiment, the video configuration file is modified so that the client device requests the initial portion of video from the server 160A and requests subsequent portions of the video from one or more of the different servers in the CDN (e.g., the servers 160B-160N). Additionally, or alternatively, the server 160A may modify or include a client-side script video player that, when executed by the client device 110, is configured to dynamically switch the source of the video as will be described later herein.

At operation 325, the server 160A fetches at least an initial portion of the segments of the video 180 if not already stored in cache for the PoP 115A. The server 160A may initiate the fetching of the video prior the client requesting the video. The initial portion may be an initial predetermined length of the video 180 (e.g., the first ten seconds of the video). The initial portion may be a predetermined size of the video 180 (e.g., the first 10 MB of video). The server 160A may also fetch the entire portion of the video. In an embodiment, the server 160A downloads each segment version (at least the initial portions of the segments) from the origin server 130 listed in the video configuration file. In another embodiment, the server 160A predicts which segment versions will be requested by the client and downloads only those segment versions. For example, a client with a relatively small screen such as a phone, typically does not benefit from having a high bit rate video. A client that has a mobile operating system, or on a mobile network, typically may not have the bandwidth to support a high bit rate video. The prediction may be based on the user-agent of the client that may suggest the screen size and/or type of operating system, and/or analyzing historical data to determine if the client is on a fast or slow network. In an embodiment, instead of downloading at least the initial portion from the origin server 130, the server 160A may download the at least the initial portion of the video from the server 160B and/or the 160C of the other PoPs of the service (if available at those servers).

If there is a link to a video in the web page, then flow moves to operation 330. At operation 330, the server 160A fetches at least an initial portion of the video 180 if not already stored in cache for the PoP 115A. The server 160A may initiate the fetching of the video prior the client requesting the video. The initial portion may be an initial predetermined length of the video 180 (e.g., the first ten seconds of the video). The initial portion may be a predetermined size of the video 180 (e.g., the first 10 MB of video). The server 160A may also fetch the entire portion of the video 180. In an embodiment, instead of downloading at least the initial portion from the origin server 130, the server 160A may download the at least the initial portion of the video from the server 160B and/or the 160C of the other PoPs of the service (if available at those servers). The server 160A, or other server of the service, may convert the video 180 into a form for streaming (e.g., MPEG-DASH and/or HLS format), and generate a video configuration file. Additionally, or alternatively, the server 160A or other server of the service may encode the video 180 into multiple different bit rates.

Although operations 325 and 330 describe the server 160A fetching video from the origin server 130, the server 160A may first query the other servers 160B-N for the portion of video (those server(s) may have that portion of video in cache). If one of the other servers 160B-N have the portion of video in cache, the server 160A may download that portion of video from that server instead of the origin server 130.

At operation 335, the server 160A receives a request for the video 180 from the client device 110. Next, at operation 340, the server 160A transmits a response to the requesting client device 110 with at least an initial portion of the requested video 180. In an embodiment, the server 160A transmits only the initial portion of the requested video 180. In another embodiment, the server 160A transmits the requested video 180 to the requesting client device 110 until it is determined that a subsequent portion of the video can be served from a different PoP of the CDN without degrading user experience (e.g., without video playback pausing or buffering). If the initial portion of video is included in multiple segments, the server 160A may receive multiple requests and transmit multiple responses to the requesting client device 110 for those segments, however this is not described in FIG. 3 for purposes of simplicity.

The server 160A and/or the requesting client device 110 may determine to dynamically switch the source of video within the CDN during the streaming or downloading of the video. For example, after receiving the initial portion of the requested video 180 from the server 160A, the requesting client device 110 may receive a subsequent portion of the requested video 180 from one or more of the servers 160B-N.

In an embodiment, the player of the client device 110 (e.g., a JavaScript player, or other web player within the client network application 112 or linked to the client network application 112) determines whether the video segments will begin to be delivered by a different server than server 160A, based on whether performance of playback of the video will be negatively impacted. The player calculates the download speed and bit rate of the video, and the amount of the video in its buffer. The player determines, based on the calculated download speed and bit rate of the video, the amount of video that is buffered, and the speed/latency to the other video locations, whether the video can begin to be downloaded from another location. The player may determine whether the same video, and optionally at the same bit rate, is available in another location. The player may query the server 160A, or another server of the CDN, for a video configuration file having a list of alternative server(s) of the CDN that can serve the same video. The player may determine the speed/latency to the alternative location(s) through testing the connections to the alternative locations (e.g., bandwidth testing, latency testing, etc.). The player may determine if a different protocol path (e.g., IPv4 vs IPv6) to the alternative locations(s) is faster. The player may determine if a different protocol type (e.g., UDP based QUIC) is faster. In an embodiment, the player transmits the results of the connection tests to the server 160A or the video control server 170, which then selects an alternative server to serve the other video segments.

In an embodiment, the video configuration file specifying the alternative locations may indicate a preference order of the alternative locations. The preference of the alternative locations may be based on cost, performance, and/or capacity. The alternative location(s) of the video may be in different tiers than the original location. For example, the servers 160B-160N may be in a lower cost data center. The preference order may differ depending on time to account for servers being in different peak times. In some circumstances, an alternative location for the video may be selected even though it is slower than the original connection and/or slower than other alternative locations. However, the selected alternative location is expected to be able to serve the video without degrading user experience (e.g., the connection is still fast enough to download the video without causing video playback to stutter or buffer).

At operation 345, the requesting client device 110 and/or the server 160A has determined to switch the source of the video and selected one of the servers 160B-N to serve the video. In an embodiment, if the video 180 is segmented, the server 160A receives a request for a subsequent video segment from the client device 110 and responds with a redirect message (e.g., an HTTP status code 302) to the selected alternative server (e.g., to a unicast IP address of the selected alternative server) that causes the client device 110 to request and receive that video segment from the selected alternative server. In another embodiment, if the video 180 is segmented, the server 160A updates the video configuration file with updated locations of the subsequent segments of the video (e.g., the URL of the subsequent segments is updated to include the unicast IP address of the selected alternative server, the URL of the subsequent segments is updated to a unique subdomain that resolves to a unicast IP address of the selected alternative server) so that the client device 110 transmits subsequent requests for video segments to the selected alternative server. In another embodiment, the video configuration file originally received from the server 160A includes the unicast IP addresses and/or unique subdomains of the possible servers 160B-N, and the client device 110 transmits subsequent requests for video segments to the selected alternative server.

If the video 180 is not segmented, in an embodiment the client device 110 transmits a request for the subsequent portion of the video through pseudo-streaming (e.g., a timestamp of where the subsequent portion of the video begins may be appended to the URL, a byte range of where the subsequent portion of the video begins may be appended to the URL), and the server 160 with a redirect message (e.g., an HTTP status code 302) to the selected alternative server (e.g., to a unicast IP address of the selected alternative server) that causes the client device 110 to request and receive the subsequent portion of the video from the selected alternative server. In another embodiment, the server 160A updates and/or transmits a video configuration file to the client device 110 that includes the location of the possible alternative servers (e.g., the unicast IP addresses of the alternative servers, unique subdomains that resolve to the unicast IP addresses of the alternative servers) and the client device 110 requests and receives the subsequent portion of the video from the selected alternative server (the client device 110 may submit a request using pseudo-streaming like described above).

The alternative servers may or may not have the requested portion of video locally available in cache. If an alternative server does not have the requested portion of video in cache, that server may fetch the requested portion of video from the origin server 130 upon request from the client device 110, and may cache the requested portion of video so that it can respond locally to future requests for the same portion of video. In another embodiment, the alternative server may download that portion of video from a different alternative server if available, and if not, fall back to downloading the requested portion of video from the origin server 130.

Thus, the client device 110 begins to receive subsequent portions of the video 180 from the selected one of the servers 160B-N. Although these subsequent portions may not be received over a connection having the same performance as the original connection to the server 160A, the subsequent portions of video are expected to be received so that user experience is not degraded. The client device 110 monitors the downloading of the subsequent portions and if it falls below a threshold that is indicative that the video may soon start pausing for buffering or starts pausing to buffer, the client device 110 can switch back to the original connection to the server 160A.

In an embodiment, if the player requests a portion of the video not in its buffer (e.g., the user has fast-forwarded or seeked forward to a position in the video not in the buffer), the video delivery is switched back to the closest PoP (e.g., the server 160A). For instance, the player may determine the seek point in the video, and send a request for the video at that point that is received by the server 160A. The request may also include information indicating to the server 160A to respond to the request locally, instead of causing the request to be redirected to another server. After receiving an initial portion of video starting at the seek position, the client device 110 and/or server 160A may determine to dynamically switch the source of the video within the CDN like previously described.

Although FIG. 3 described the server 160A receiving a request for the video 180 from the client device 110, in an alternative embodiment, the server 160A pushes at least the initial portion of the video 180 (e.g., using HTTP/2) to the client device 110.

Although FIG. 3 described the server 160A fetching at least a portion of the video before receiving a request for the video in operations 325 and 330, in an alternative embodiment, the server 160A does not fetch the initial portion of the video until after receiving a request for the video from a client device.

Figure 4:
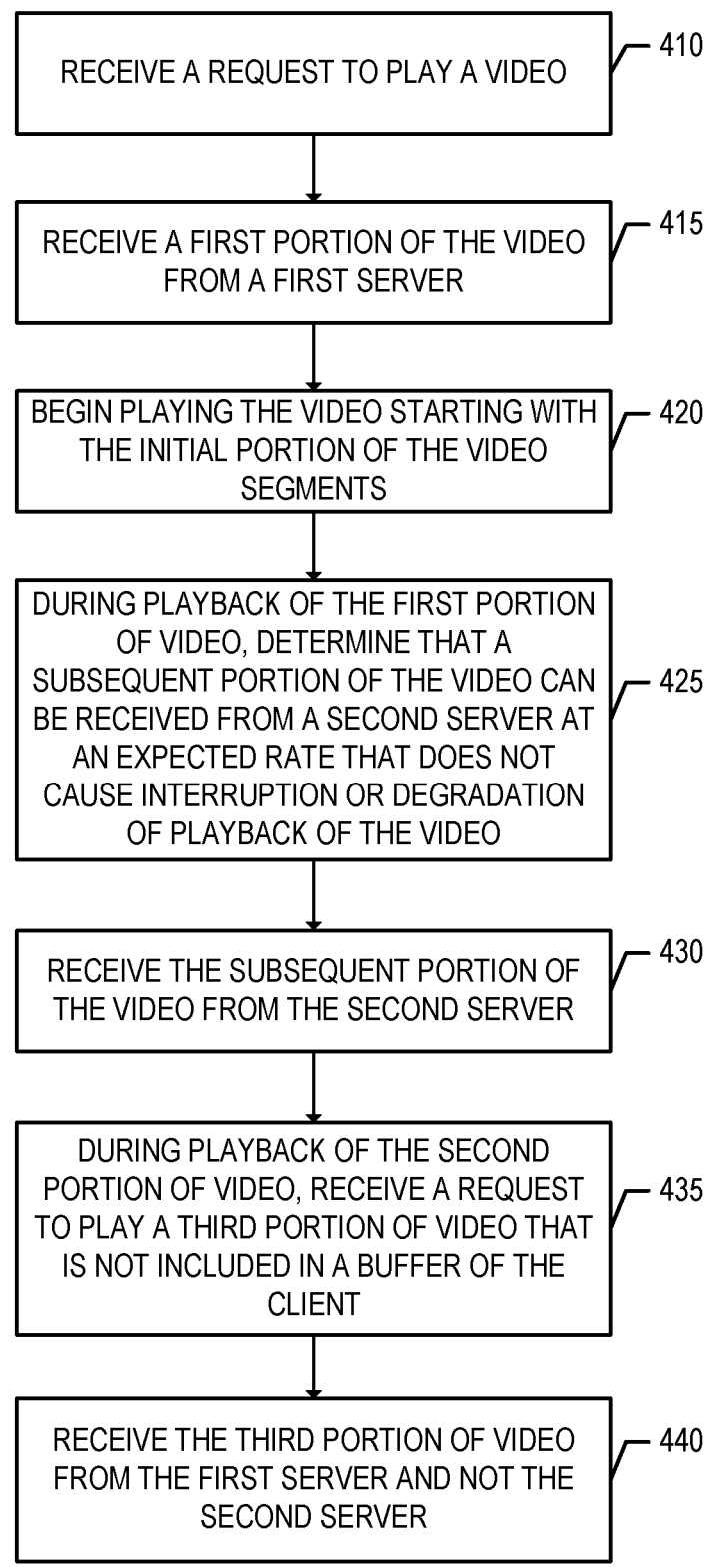
FIG. 4 is a flow diagram illustrating exemplary operations for a client network application to play a video that is delivered according to embodiments described herein.

FIG. 4 is a flow diagram illustrating exemplary operations for a client network application to play a video that is delivered according to embodiments described herein. The operations of FIG. 4 will be described with respect to the exemplary embodiment of FIGS. 1-2. The operations of FIG. 4 will be described with respect to the exemplary embodiment of FIGS. 1-2. However, the operations of FIG. 4 can be performed by different embodiments than those of FIGS. 1-2, and FIGS. 1-2 can perform operations different than those of FIG. 4. For purposes of describing FIG. 4, the first server is the server 160A, and the second server is the server 160B.

At operation 410, the player of the client device 110 (e.g., a JavaScript player, or other web player within the client network application 112) receives a request to play a video. For example, the user may select to play a video that is included on a web page. The web page may include or link to a video player that may run within the client network application 112.

Next, at operation 415, the client network application 112 receives a first portion of the video from a first server 160A. The first portion of video is the initial portion of video (e.g., the first X number of seconds or frames). The first portion of video may be at a lower quality (a smaller bit rate) than other portions of video that will be received at the client network application 112.

The client network application 112 may receive the first portion of video responsive to the client network application 112 requesting the video from the server 160A, and receiving a response from the server 160A having the first portion of video. The server 160A may receive the request because it is the closest one of the servers 160A-N according to an anycast implementation. There may be multiple request/response pairs to receive the initial portion of video. Alternatively, the client network application 112 may receive the first portion of video through the server 160A pushing at least that portion of video to the client network application 112 (e.g., through HTTP/2 server push). The video may be segmented into multiple segments. In addition to the first portion of video, the client network application 112 may receive a video configuration file from the server 160A or the video control server 170 that lists multiple servers that are candidates for delivering other portions of the video. The video configuration file may also provide the locations of segments of the video if the video is segmented.

Although operation 415 is described after receiving a request to play a video, the client network application 112 may begin to receive the first portion of video prior to the user requesting the video be played (e.g., the first portion of video may be received and buffered after the player loads).

Next, at operation 420, the player of the client device 110 begins playing the video starting with the initial portion of the video. The playback may begin shortly after the start of the initial portion of the video is received. That is, the playback of the video does not necessarily need to wait until the entire initial portion of video is received. At operation 425, during playback of the initial portion, a determination is made that the subsequent portion of the video can be received from a second server at an expected rate that would not cause interruption or degradation of playback of the video. The client network application 112 and/or the server 160A may make this determination. For instance, the client network application 112 may test the connections to the alternative servers as listed in the video configuration file to determine the expected performance of the alternative connections (e.g., the bandwidth/latency), and determine based on the bit rate of the video and the expected performance, which alternative server(s) would be able to serve the video without causing interruption or degradation of playback of the video. The alternative servers may be listed in the video configuration file in a preference order, and the first one of those servers that is expected to be able to serve the video without causing interruption or degradation of playback of the video is selected. The preference order may be in terms of cost (e.g., starting with the cheapest), capacity (e.g., starting with the server having the most capacity), availability (e.g., starting with the server that historically has the least processing load at the time of the request), reliability (e.g., starting with the server that historically is most reliable), or any combination thereof. Alternatively, the alternative servers may be selected through other load balancing techniques such as round-robin selection or random selection.

After the second server 160B is selected, the client network application 112 receives the second portion of the video from the server 160B, and not the server 160A, at operation 430. The second portion of video is the subsequent portion of the video. For example, if the video is segmented into 10 segments and the initial portion is segments 1-2, the subsequent portion of the video starts at segment 3.

The client network application 112 may receive the second portion of the video from the server 160B by directly requesting the second portion of video from the server 160B, according to an embodiment. There may be multiple request/response pairs to receive the second portion of video. In an embodiment, the video configuration file may include the unicast IP addresses of the alternative servers (including the server 160B), and/or unique subdomains of the alternative servers (including the server 160B), and the client network application 112 may transmit a request to the server 160B using this information, and receive a response having the second portion of video. Alternatively, the video configuration file may be updated by the server 160A (or the video control server 170) with updated location(s) of the subsequent portion of video (e.g., the URL of the subsequent segments are updated to include the unicast IP address of the second server, or the URL of the subsequent segments are updated to a unique subdomain that resolves to a unicast IP address of the selected server) so that the client device 110 transmits subsequent requests for the video to the server 160B. If the video is segmented and each segment has a different URL, the client network application 112 transmits a request starting at the next segment's URL that is not buffered. For instance, if the initial portion of video is segments 1-2 that have been buffered, the client network application 112 submits a request for the URL of segment 3, and so on. If the video is not segmented, the client network application 112 may transmit a request for the second portion of the video through pseudo-streaming (e.g., a timestamp of where the subsequent portion of the video begins may be appended to the URL, a byte range of where the subsequent portion of the video begins may be appended to the URL).

The client network application 112 may receive the second portion of the video from the server 160B because of a redirect message (e.g., an HTTP status code 302) received from the server 160A, according to an embodiment. In this embodiment, the client network application 112 transmits a request to the server 160A for the second portion of the video (either to the URL of the next segment that it is not buffered, or using pseudo-streaming as described above), and receives a response from the server 160A with a redirect message (e.g., an HTTP status code 302) to the server 160B, that causes the client network application 112 to transmit the request to the server 160B. The redirect may be to a unicast IP address of the server 160B or to a unique subdomain that resolves to a unicast IP address of the server 160B. The client network application 112 may transmit metadata along with the request to the server 160 for the video. This metadata may include, for example, the client's time of day and/or whether a low latency connection is requested (e.g., for the initial segment of video or the start of a seeked video not in the buffer of the client network application 112). The server 160A may use this information, and optionally other information (e.g., current traffic utilization to each PoP, current speed/latency from the client network application 112 to each PoP, cost of the connections from the client network application 112 to each PoP, and/or static mappings to larger PoPs that may be suited to handle additional load) when determining to redirect the client network application 112 to another server.

The client network application 112 buffers the second portion of the video and can playback the video. If the client network application 112 receives a request for a portion of the video that is not in the buffer (e.g., the user has fast-forwarded or seeked forward to a position of the video not in the buffer, the user has rewound to a position of the video not in the buffer), the delivery of the video at that point may switch back to the server 160A. At operation 435, during playback of the second portion of video, the client network application 112 receives a request to play a third portion of video that is not in the buffer of the client network application 112. Then, at operation 440, the client network application 112 receives the third portion of the video from the server 160A, and not the server 160B. The client network application 112 may receive the third portion of video because of a similar request/response pair to the server 160A as described for the first portion of video. After receiving an initial portion of video starting at the beginning of the third portion of video, the delivery of the video may dynamically switch to another server in a similar way as described with respect to operations 425-430.

Figure 5:
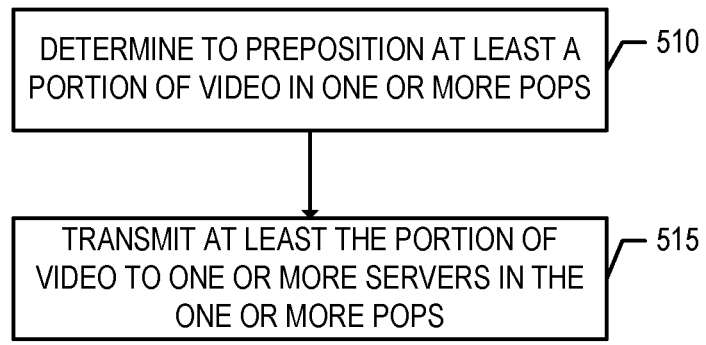
FIG. 5 is a flow diagram that illustrates exemplary operations for prepopulating at least a portion of a video to one or more servers in a CDN, according to an embodiment.

As previously described, at least a portion of a video may be prepositioned on one or more of the servers 160A-N. This reduces the time necessary to respond to a request for that video, and reduces the load on the origin server 130. FIG. 5 is a flow diagram that illustrates exemplary operations for prepopulating at least a portion of a video to one or more servers in a CDN, according to an embodiment. The operations of FIG. 5 will be described with respect to the exemplary embodiment of FIGS. 1-2. The operations of FIG. 5 will be described with respect to the exemplary embodiment of FIGS. 1-2. However, the operations of FIG. 5 can be performed by different embodiments than those of FIGS. 1-2, and FIGS. 1-2 can perform operations different than those of FIG. 5.

At operation 510, the video manager 174 determines to preposition at least a portion of a video to one or more of the servers 160A-N of the PoPs 115A-N respectively. For instance, the video manager 174 may determine if the video (or at least a portion of the video) is likely to be requested by clients (or many clients), and which PoPs are likely to receive the requests. If the video is likely to be requested by clients at a particular PoP, then the video manager 174 may determine to preposition at least a portion of that video on that PoP. Since some versions of video may not be requested as often as others, the video manager 174 may determine to preposition only certain version(s) of the video (different bit rates, different language audio).

Next, at operation 515, the video manager 174 causes at least a portion of the video to be transmitted to one or more of the servers 160A-N of the PoPs 115A-N. The video can be transmitted to the servers directly, or a URL to the video on the origin server 130 can be provided to those servers to initiate a download of the video.

Figure 6:
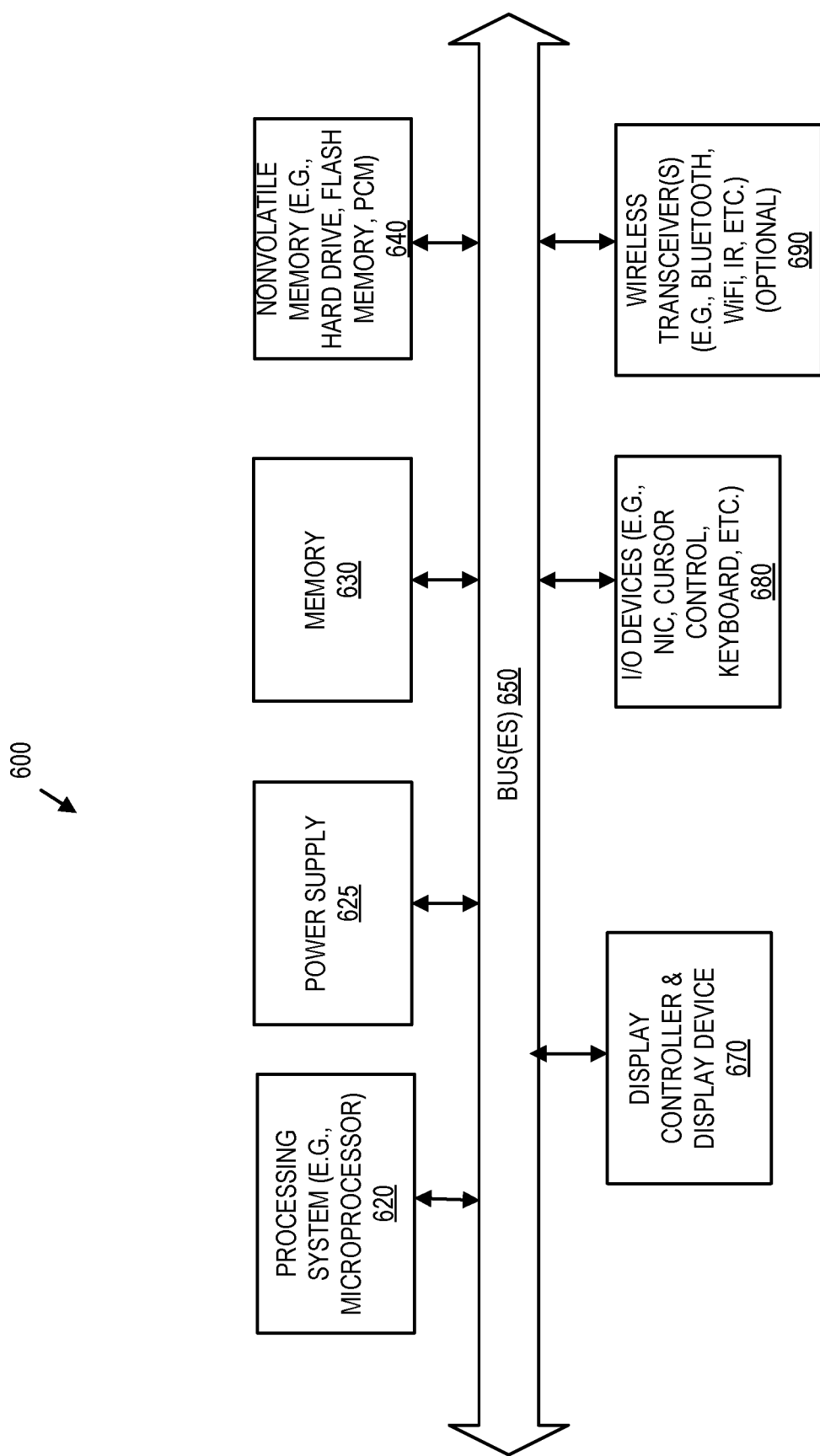
FIG. 6 illustrates an exemplary format of a computer system of devices of the video delivery, according to an embodiment.

As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver (s) 690 (e.g., Bluetooth, WiFi, Infrared, etc.). In one embodiment, the client devices 110, the servers 160A-N, the video control server 170, and/or the origin server 130 can take the form of the computer system 600.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

Although the preceding description described delivering video (which often includes audio), the techniques described can also deliver audio in a similar way.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a client device for playing a video in the client device, comprising:
    receiving a first portion of a video from a first server prior to receiving a request to play the video, wherein the first portion is an initial portion of the video, wherein the first portion is received in a plurality of bit rate versions, and wherein the initial portion of the video is prepositioned in the first server based on a likelihood of the video being requested in a geographic region served by the first server;
    receiving a request to play the video;
    playing the video starting at the first portion of the video, wherein the bit rate version of the first portion of the video that is played is a first bit rate version of the video selected from the plurality of bit rate versions based on client device data;
    during playback of the first portion of the video and responsive to determining that a second portion of the video can be received from a second server at an expected rate that would not cause interruption or degradation of playback of the video,
        receiving the second portion of the video from the second server and not the first server, wherein the second portion of the video is a portion of the video that is subsequent to the initial portion of the video, and wherein the second portion of the video that is received from the second server is a second bit rate version of the video selected from the plurality of bit rate versions;
    continuing playback of the video including the second portion of the video;
    during playback of the second portion of the video received from the second server,
        receiving a request to play a third portion of the video that is not included in a buffer of the client device, and
        receiving the third portion of the video from the first server and not the second server; and
    continuing playback of the video including the third portion of the video received from the first server.

2. The method of claim 1, wherein the first server and the second server are anycasted to a same IP address for the video, and wherein the first server is closer to the client device as determined by an anycast implementation.

3. The method of claim 1, wherein the first portion of the video is received from the first server through a push without first requesting the first portion of the video.

4. The method of claim 1, wherein receiving the second portion of the video from the second server is a result of operations including:
    transmitting a request for the second portion of the video to the first server;
    receiving, from the first server, a redirect message to the second server for the second portion of the video; and
    transmitting the request for the second portion of the video to the second server.

5. The method of claim 1, wherein receiving the second portion of the video from the second server is a result of operations including:
    receiving a file that identifies a location of the second server; and
    transmitting a request for the second portion of the video to the identified location of the second server.

6. The method of claim 1, further comprising:
    receiving a file that lists a plurality of servers that includes the second server, wherein each of the plurality of servers is a candidate for delivering the second portion of the video; and
    wherein determining that the second portion of the video can be received from the second server, includes determining network conditions to each of the plurality of servers to estimate a speed that the second portion of the video could be received from each of the plurality of servers.

7. A method performed by a first server of a plurality of servers in a content delivery network (CDN) for distributing video in the CDN, comprising:
    receiving, from a client device, a request for a web page of a domain handled by an origin server;
    retrieving the requested web page, wherein the web page references a video;
    transmitting a response to the client device that includes the web page;

retrieving a video configuration file that indicates a list of a plurality of locations of the domain in which a plurality of portions of the video are located;

in response to retrieving the video configuration file, fetching at least an initial portion of the plurality of portions of the video based on one or more of client historical data and client device data prior to receiving a request for the video from the client device, wherein the initial portion of the plurality of portions of the video is received in a plurality of bit rate versions;

transmitting to the client device, prior to receiving a request for the video from the client device, at least multiple bit rate versions of the plurality of bit rate versions of the initial portion of the plurality of portions;

receiving, from the client device, a request for a subsequent portion of the plurality of portions of the video; and transmitting a response to the client device that instructs the client device to transmit the request for the subsequent portion of the plurality of portions of the video to a second server of the plurality of servers.

8. The method of claim 7, wherein the domain handled by the origin server resolves to an IP address that is anycasted on each of the plurality of servers, and wherein the request for the web page is received at the first server due to the first server being a closest one of the plurality of servers as determined by an anycast implementation.

9. The method of claim 7, further comprising:
wherein the response transmitted to the client device that included the web page includes a client-side script video player that, when executed by the client device, is configured to perform the following:
test connections to the plurality of servers to determine performance of the plurality of servers, and
transmit results of the tested connections to the first server; and
selecting, based on the results of the tested connections, the second server to serve the subsequent portion of the plurality of portions of the video to the client device.

10. The method of claim 7, wherein the fetching the at least the initial portion of the plurality of portions includes:
transmitting a request for the at least the initial portion of the plurality of portions to the origin server; and
receiving a response from the origin server that includes the at least the initial portion of the plurality of portions.

11. The method of claim 7, wherein the fetching the at least the initial portion of the plurality of portions includes:
transmitting a request for the at least the initial portion of the plurality of portions to a different one of the plurality of servers; and
receiving a response from the different one of the plurality of servers that includes the at least the initial portion of the plurality of portions.

12. The method of claim 7, further comprising:
wherein the response transmitted to the client device that included the web page includes a client-side script video player that, when executed by the client device, is configured to perform the following:
during playback of the subsequent portion of the plurality of portions and responsive to receipt of a request to play a portion of video portions that is not included in a buffer available to the client-side script video player, transmit a request to the first server for that portion of video portions.

13. A non-transitory machine-readable storage medium that provides instructions that, when executed by a processor of a client device, cause said processor to perform operations comprising:

receiving a first portion of a video from a first server prior to receiving a request to play the video, wherein the first portion is an initial portion of the video, wherein the first portion is received in a plurality of bit rate versions, and wherein the initial portion of the video is prepositioned in the first server based on a likelihood of the video being requested in a geographic region served by the first server;

receiving a request to play the video;

playing the video starting at the first portion of the video, wherein the bit rate version of the first portion of the video that is played is a first bit rate version of the video selected from the plurality of bit rate versions based on client device data;

during playback of the first portion of the video and responsive to determining that a second portion of the video can be received from a second server at an expected rate that would not cause interruption or degradation of playback of the video,
receiving the second portion of the video from the second server and not the first server, wherein the second portion of the video is a portion of the video that is subsequent to the initial portion of the video, and wherein the second portion of the video that is received from the second server is a second bit rate version of the video selected from the plurality of bit rate versions;

continuing playback of the video including the second portion of the video;

during playback of the second portion of the video received from the second server,
receiving a request to play a third portion of the video that is not included in a buffer of the client device, and
receiving the third portion of the video from the first server and not the second server; and continuing playback of the video including the third portion of the video received from the first server.

14. The non-transitory machine-readable storage medium of claim 13, wherein the first server and the second server are anycasted to a same IP address for the video, and wherein the first server is closer to the client device as determined by an anycast implementation.

15. The non-transitory machine-readable storage medium of claim 13, wherein the first portion of the video is received from the first server through a push without first requesting the first portion of the video.

16. The non-transitory machine-readable storage medium of claim 13, wherein receiving the second portion of the video from the second server is a result of operations including:
transmitting a request for the second portion of the video to the first server;
receiving, from the first server, a redirect message to the second server for the second portion of the video; and
transmitting the request for the second portion of the video to the second server.

17. The non-transitory machine-readable storage medium of claim 13, wherein receiving the second portion of the video from the second server is a result of operations including:
receiving a file that identifies a location of the second server; and transmitting a request for the second portion of the video to the identified location of the second server.

18. The non-transitory machine-readable storage medium of claim 13 that further provides instructions that, when executed by the processor of the client device, cause said processor to further perform operations comprising:
receiving a file that lists a plurality of servers that includes the second server, wherein each of the plurality of servers is a candidate for delivering the second portion of the video; and
wherein determining that the second portion of the video can be received from the second server, includes determining network conditions to each of the plurality of servers to estimate a speed that the second portion of the video could be received from each of the plurality of servers.

19. A non-transitory machine-readable storage medium that provides instructions that, when executed by a processor of a first server of a plurality of servers in a content delivery network (CDN), cause said processor to perform operations for distributing video in the CDN comprising:
receiving, from a client device, a request for a web page of a domain handled by an origin server;
retrieving the requested web page, wherein the web page references a video;
transmitting a response to the client device that includes the web page;
retrieving a video configuration file that indicates a list of a plurality of locations of the domain in which a plurality of portions of the video are located;
in response to retrieving the video configuration file, fetching at least an initial portion of the plurality of portions of the video based on one or more of client historical data and client device data prior to receiving a request for the video from the client device, wherein the initial portion of the plurality of portions of the video is received in a plurality of bit rate versions;
transmitting to the client device, prior to receiving a request for the video from the client device, at least multiple bit rate versions of the plurality of bit rate versions of the initial portion of the plurality of portions;
receiving, from the client device, a request for a subsequent portion of the plurality of portions of the video; and
transmitting a response to the client device that instructs the client device to transmit the request for the subsequent portion of the plurality of portions of the video to a second server of the plurality of servers.

20. The non-transitory machine-readable storage medium of claim 19, wherein the domain handled by the origin server resolves to an IP address that is anycasted on each of the plurality of servers, and wherein the request for the web page is received at the first server due to the first server being a closest one of the plurality of servers as determined by an anycast implementation.

21. The non-transitory machine-readable storage medium of claim 19 that further provides instructions that, when executed by the processor of the first server, cause said processor to further perform operations comprising:
wherein the response transmitted to the client device that included the web page includes a client-side script video player that, when executed by the client device, is configured to perform the following:
test connections to the plurality of servers to determine performance of the plurality of servers, and
transmit results of the tested connections to the first server; and
selecting, based on the results of the tested connections, the second server to serve the subsequent portion of the plurality of portions of the video to the client device.

22. The non-transitory machine-readable storage medium of claim 19, wherein the fetching the at least the initial portion of the plurality of portions includes:
transmitting a request for the at least the initial portion of the plurality of portions to the origin server; and
receiving a response from the origin server that includes the at least the initial portion of the plurality of portions.

23. The non-transitory machine-readable storage medium of claim 19, wherein the fetching the at least the initial portion of the plurality of portions includes:
transmitting a request for the at least the initial portion of the plurality of portions to a different one of the plurality of servers; and
receiving a response from the different one of the plurality of servers that includes the at least the initial portion of the plurality of portions.

24. The non-transitory machine-readable storage medium of claim 19 that further provides instructions that, when executed by the processor of the first server, cause said processor to further perform operations comprising:
wherein the response transmitted to the client device that included the web page includes a client-side script video player that, when executed by the client device, is configured to perform the following:
during playback of the subsequent portion of the plurality of portions and responsive to receipt of a request to play a portion of video portions that is not included in a buffer available to the client-side script video player, transmit a request to the first server for that portion of video portions.

* * * * *